United States Patent [19]

Marraccini et al.

[11] Patent Number: 4,609,404
[45] Date of Patent: Sep. 2, 1986

[54] ORGANIC DYES CONTAINING SILANE GROUPS AND PROCESS FOR PREPARING SAME

[75] Inventors: Antonio Marraccini, Dormeletto; Filippo M. Carlini, Novara; Antonio Pasquale, Novara; Giorgio Maranzana, Novara, all of Italy

[73] Assignee: Montedison S.p.A., Milan, Italy

[21] Appl. No.: 524,083

[22] Filed: Aug. 17, 1983

[30] Foreign Application Priority Data

Aug. 20, 1982 [IT] Italy ................................ 22915 A/82

[51] Int. Cl.$^4$ ............................ C09C 1/28; C09C 1/36
[52] U.S. Cl. ............................ 106/288 Q; 106/291; 106/299; 106/300; 106/308 Q
[58] Field of Search .......... 106/288 Q, 308 N, 308 Q, 106/291, 299, 300

[56] References Cited

U.S. PATENT DOCUMENTS 3,761,297 9/1973 Figueras ............................ 106/289

OTHER PUBLICATIONS

Chemical Abstract, No. 88644z, vol. 74, 1971.

Primary Examiner—Amelia B. Yarbrough
Attorney, Agent, or Firm—Morgan & Finnegan

[57] ABSTRACT

This invention relates to organic dyes containing silane groups; composite pigments obtainable by grafting said dyes onto an inorganic substrate; and, the respective processes for preparing said dyes and composite pigments.

The dyes have general formula:

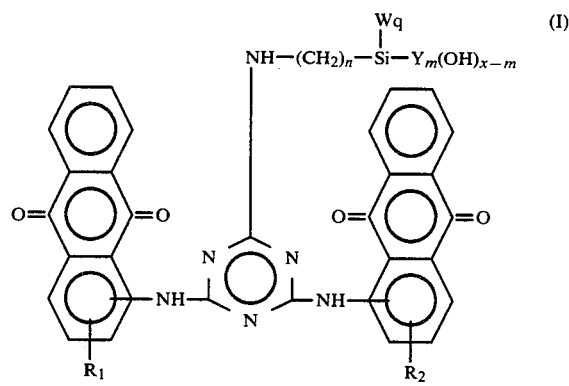

wherein $R_1$ and $R_2$, which may be equal or different, are selected from the group consisting of H, —NH$_2$, —NHR wherein R is an alkyl group having from 1 to 4 carbon atoms or a phenyl group, —NHCOCH$_3$, —NHCOC$_6$H$_5$, —NO$_2$, a halogen, —OH, —O—C$_6$H$_5$ and —S—C$_6$H$_5$; n is a number selected from 3, 4 and 5; W is selected from the group consisting of an alkyl group having from 1 to 4 carbon atoms and a phenyl group; Y is an alkoxy group having from 1 to 4 carbon atoms; q is a number selected from 0 and 1; X is 3 and m is a number selected from 0, 1, 2 and 3 when q is 0; x is 2 and m is a number selected from 0, 1 and 2 when q is 1. The composite pigments obtained from said dyes are employed in the painting products, air enamels and stoving enamels, in the pigmentation of plastic materials, in the inks and in the printing of fabrics.

15 Claims, No Drawings

ORGANIC DYES CONTAINING SILANE GROUPS AND PROCESS FOR PREPARING SAME

THE INVENTION

This invention relates to a new type of organic -s-triazinyl-bis-anthraquinone dye, containing silane groups described hereinafter in detail. The present invention also includes composite pigments containing said dyes in combination with an inorganic solid.

In the description which follows, the term "composite pigment" means a pigmentary material, consisting of an association of the abovesaid dyes containing a silane group with an inorganic solid substrate or support. The above-mentioned association of the organic dye containing a silane group, or what may be referred to as a silanic dye, with the solid support results in imparting to said silanic organic dye a pigmentary nature. Such association is obtained by formation of chemical bonds (grafting), between the silanic part of the silanic organic dye and the inorganic support.

PRIOR ART BACKGROUND

In the prior art literature there have been described processes for modifying with derivatives of silanic type the surface of filler or pigment materials, such as $SiO_2$, $TiO_2$, aluminas etc. employed in many thermoplastic and thermosetting materials, to improve the adhesion between the fillers or pigments and the other components. The filler or pigment so obtained may be finally coloured with conventional dyes. Such conventional dyes include common reactive or acid polysulphonic dyes, which do not contain silane residues and are soluble in water. The dyes of the present invention are s-triazinyl-bis-anthraquinones and are different from the aforementioned previously known dyes. Furthermore, the method for preparing the earlier mentioned coloured prior art pigments is substantially different from the one used for preparing the pigments according to the present invention.

OBJECTS OF THE INVENTION

It is an object of this invention to provide novel organic dyes containing a silane group which are insoluble in water and suitable to provide novel composite pigments by grafting onto the surface of an inorganic substrate.

Another object of this invention is to provide novel methods for the preparation of dyes and pigments mentioned in the first object, which methods are simple and economically attractive.

These and still other objects, will more clearly appear from the detailed discussion which follows.

GENERAL DESCRIPTION OF THE INVENTION

It has been found that the objects of this invention may be realized by forming novel silanic organic dyes of s-triazinyl-bis-anthraquinone type: by forming novel composite pigments derived from said novel dyes and by providing novel methods for the production of said dyes and pigments.

More particularly, it has been found that an object of the present invention is formed by the formation of organic s-triazinyl-bis-anthraquinones dyes containing a silane group, having the formula:

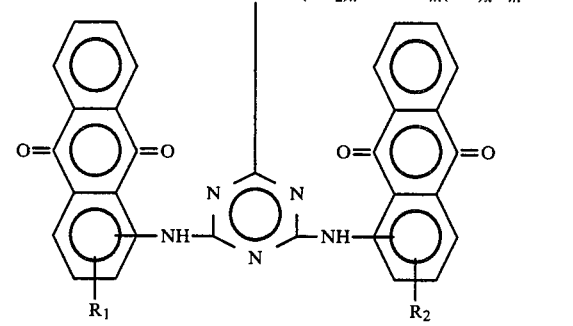

wherein $R_1$ and $R_2$, equal to each other or different from each other, are selected from the group consisting of a hydrogen atom, a primary amine group ($NH_2$) or secondary amine group of the —NH—R type, wherein R is an alkyl group containing from 1 to 4 carbon atoms or a phenyl group, an —NH—CO—$CH_3$ acetylamino group, an

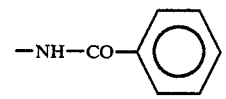

benzoylamino group, an —$NO_2$ nitro group, a halogen preferably bromine or chlorine, a hydroxyl radical, a phenol group and a thiophenol group;

n is a whole number comprised between 3 and 5;
w indicates an akyl group containing from 1 to 4 carbon atoms or a phenyl group;
Y indicates an alkoxy group containing from 1 to 4 carbon atoms;
q is a whole number selected from 0 and 1;
x and m are whole numbers such that: when q=0 x=3 and m=0, 1, 2, 3 and when q=1 x=2 and m=0, 1, 2.

In the dyes of this invention which have the chemical formula of formula (1), the organic chromophoric part of the dye is provided by a s-triazinyl-bis-anthraquinone dye segment, free from sulphonic groups. The dyes of formula (I) are endowed with a certain solubility in organic solvents and possess a good tinting strength with pure tonalities in a large range from yellow to red, to blue with a good fastness towards the light.

The silanic dyes of formula 1 are formed by a process characterized in that a silane compound of formula (II)

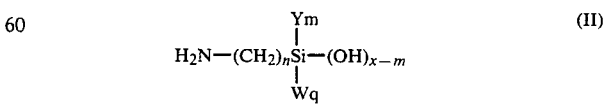

wherein n, q, x, m, y and w are as hereinbefore defined, is reacted with a s-triazinyl-bis-anthraquinone compound, selected from compounds having the formula (III)

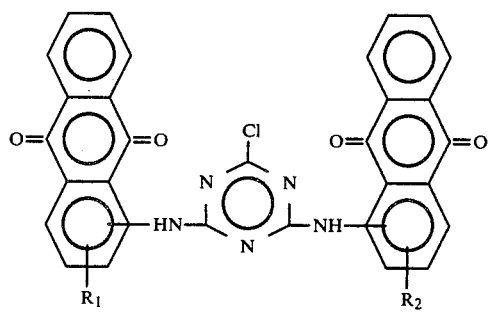

(III)

wherein R₁ and R₂ have the meaning already specified, in an inert organic medium, at a temperature ranging between 80° and 180° C., in a time period of 1–5 hours, optionally in the presence of an acid-acceptor compound, in a silane formula II: anthraquinone formula III substantially equimolar ratio. As hereinbefore mentioned one works in an inert organic medium preferably selected from nitrobenzene, dichlorobenzene and dimethylformamide.

As acidity acceptors use can be made of inorganic compounds such as, for instance, $Na_2CO_3$, $NaHCO_3$ or organic compounds such as, for instance, triethylamine, pyridine, in substantially stoichiometric amounts with respect to the formula (III) anthraquinone. The halogen-s-triazinyl-bis-anthraquinone derivatives of formula (III) are compounds which can be prepared, according to conventional techniques, for instance, by condensation with cyanuric chloride of aminoanthraquinone derivatives of formula (IV), known in themselves.

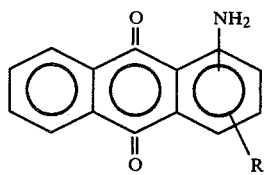

wherein, with respect to formula (III) R indicates R₁ or R₂, as hereinabove defined, in organic solvents such as, for instance, nitrobenzene, dichlorobenzene, dimethylformamide or in mixtures water-acetonitrile, at temperatures ranging between 0° C. and 130° C. during 2–6 hours.

Examples of aminoanthraquinone derivatives employable, according to the present invention are:

α-aminoanthraquinone; β-aminoanthraquinone; 1,4diaminoanthraquinone; 1,5-diaminoanthraquinone; 1-amino-4-acetylaminoanthraquinone; 1-amino-4-benzoylamino anthraquinone; 1-amino-5-acetylamino-anthraquinone; 1-amino-5-benzoylamino-anthraquinone; 1-amino-4-nitro-anthraquinone; 1-amino-5-nitro-anthraquinone; 1-amino-4-bromo-anthraquinone; 1-amino-4-methylamino-anthraquinone; 1-amino-4-phenylamino-anthraquinone.

These compounds, in their turn, are known compounds, which can be prepared according to conventional techniques or can be found in the commerce.

Silane derivatives having formula (II), which proved to be particularly suitable for preparing silanic dyes of formula (I), according to the present invention, are the ones derived from amino-alkoxy-silanes, such as, for instance γ-aminopropyltriethoxysilane, δ-aminobutyl-triethoxy-silane, δ-aminobutylphenyl-diethoxysilane, γ-aminopropyl-methyl-diethoxysilane.

These compounds are known and commercially available. However, they can be prepared, according to substantially conventional techniques, for instance, by reacting the corresponding chloro-alkoxy-silanes, such as γ-chloro-propyl-triethoxy-silane with aliphatic amines.

The silanic dyes of formula I do not possess, in themselves, any pigmentary characteristic. Nevertheless, according to their structural characteristic, the presence in the molecule of silanolic groups and/or alkoxy groups, hydrolizable to silanolic groups —Si(OH)₃, imparts to the structure the capability both of providing self-condensation reactions between the above said silanolic group and of chemically reacting with the surface of proper inorganic substrates, provided with surface hydroxyl groups (—OH), which condense with the ones of the silanic dye (I), thus forming a stable chemical bond (grafting) with the substrate and giving place to a product having pigmentary characteristics.

The above cited condensation reactions of silanic dye (I) with the inorganic substrate and condensation reactions between molecules of dye (I), allow to chemically "graft" silanic dyes (I) to the substrate surface where there is formed a composite structure, according to the present invention, within quantitative ratios controllable in the preparation process.

Thus the dyes of this invention are employed in the preparation of the composite pigments of the invention which composite pigment consists of the silanic dyes of formula (I), grafted on an inorganic support.

The silanic compounds of general formula (I) proved to be particularly suitable to provide composite pigments, when the secondary amine group that forms a bridge between the cyanuliric nucleus:

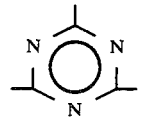

and the anthraquinonic system:

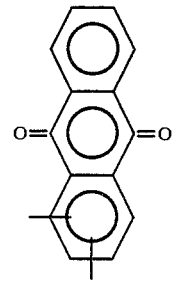

is linked on position alpha of the latter, R₁ and R₂ are equal to each other and bounded in position 4 or 5 of the anthraquinonic system and q is 0.

As substrates or supports, particularly suitable for imparting the pigmentary nature to the silanic dyes of formula (I) are the following materials: $TiO_2$, in its gel, semi-crystalline, rutile or anatase forms. The substrates may be characterized by the presence of surface coatings and consists of mixtures containing one or more oxides selected from $SiO_2$, $Al_2O_3$, $TiO_2$, or it is possible to employ physical mixtures of $TiO_2$ with $SiO_2$ and/or $Al_2O_3$ or, finally $SiO_2$ and/or $Al_2O_3$, finely particulated. Alumino-silicates (clays), mica, talc are employable as well.

The specific surface of such materials may vary within a wide range, from 5 to 500 $m^2/g$. Advantageous results are obtained with values ranging between 10 and 200 $m^2/g$.

As to the uses, desired hiding power, etc., the abovesaid substrates or supports may be also utilized in mixture with each other. The composite pigments containing from 10 to 50% by weight of the silanic dyes of formula (I) in the grafted form, are particularly preferred owing to their higher characteristics.

The process for preparing composite pigments consisting of s-triazinyl-bis-anthraquinone dyes and of the abovesaid inorganic supports, consists in treating the selected substrate with a silanic dye (I) in a reaction medium, consisting of an organic inert solvent at a temperature ranging between 20° C. and the solvent reflux temperature, preferably between 60° and 150° C. and in the presence of water (acid due to HCl or alkaline due to NaOH), with an at least equimolecular ratio with respect to the present alkoxy groups to be hydrolized, or in a reaction medium consisting of, optionally acid or alkaline, water at a temperature ranging between 20° and 90° C.

After 2-16 hours of the abovesaid treatment and optionally after a partial distillation of the reaction medium, the pigment is filtered. The obtained wet paste is treated at 100°-140° C. for 2-16 hours, optionally hot washed with organic solvents and finally dried. By employing the organic solvent it is possible to use silanic dye (I), that has been previously hydrolized by means of optionally slightly acid or alkaline, water at a temperature of 20°-90° C. for 1-4 hours. By using the water as reaction medium, the substrate can be formed "in situ", by precipitation in the presence of the silanic dye. To improve the condensation of the dye coating on the substrate it can be advantageously operated in the presence of catalysts such as LiOH, $CF_3COOH$, Pb acetate, cobalt nephthenante.

Further advantages can be achieved when the above cited process is carried out also in the presence of tetraalkoxy-silanes having up to 4 carbon atoms, such as $Si(OCH_3)_4$ or vinyl-triethoxy-silane $_2HC=CH-Si-(OC_2H_5)_3$, or alkyl-ortho-titanates, such as $Ti(OC_4H_9)_4$, in amounts ranging from 0.1:1 to about 1:1 by weight referred to the dye of formula (I), with which they form insoluble copolymers, which are particularly suitable for coating the substrate.

The employed inert organic solvents are preferably selected from the aliphatic hydrocarbons (n-heptane) and chlorinated derivatives thereof (tetrachloroethane), alicyclic and aromatic hydrocarbons (benzene, toluene, xylenes, nitrobenzene, chlorobenzes), the alkyl or aryl ethers and ketones (N-methyl-pyrrolidone, diphenylether), the oxides (dioxane), the amides (dimethylformamide), the nitriles (acetonitrile) and the sulphoxides (dimethylsulphoxide). The preparation process forming the object of this invention results particularly suitable to obtain brightly dyed pigments, with a high tinting strength, also in the presence of inorganic substrate having a low specific surface, such as, for instance, highly hiding $TiO_2$.

The composite pigments, obtained according to the present invention, have a composition varying within a wide range, depending on the nature, the amount of silanic dye, the inorganic substrate, granulometry, specific surface, etc.

The composite pigments of this invention exhibit excellent pigmentary characteristics, are insoluble in water and in the common organic solvents and possess furthermore a good tinting strength, an excellent stability to heat, a fastness towards the light, towards the bases and towards the acids, towards the migration into plastic materials, such as polyvinylchloride (PVC), towards the overpainting in stoving enamel, and are easily dispersible, etc. Finally they may be obtained both in the transparent form and in a very hiding form.

Therefore, they are best utilized in the painting products, in the air and stoving enamels, in the pigmentation of the plastic materials, in the inks, in the printing of fabrics, etc., according to conventional applicative techniques.

The composite pigments obtained according to the present invention, exhibit the advantage of consisting of a portion, or inorganic substrate, of low cost and capable of imparting excellent pigmentary characteristics, among which, in particular, the desired hiding power degree, on which portion an organic dye with a high tinting strength and pure tones is grafted.

Such an advantage can be better appreciated if one considers that organic silanic dyes (I), as above-mentioned, may be more or less soluble in the organic solvents and, therefore, may not possess by themselves any pigmentary characteristics which is, on the contrary, attained by the composite pigments of the present invention.

This allows, in more than one application, to improve some organic dyes, successfully and economically extending the use thereof to pigmentary applications which are very interesting from an industrial point of view.

In this respect, the present invention represents a considerable contribution to the solution of the problem, represented by the high toxicity connected with the utilization of the inorganic pigments, which are broadly employed and now objectable from this point of view, such as, for instance, the pigments based on chromium and lead.

The granulometric analysis of the composite pigment, obtained according to the present invention, shows that the inorganic portion is essentially distributed on the surface of the inorganic substrate particles.

The mechanical and/or thermic treatment employed in the conventional techniques for the use of the pigments in the various applicative fields, do not substantially modify the granulometry and, by consequence the pigmentary characteristics of the products, obtained according to the present invention.

SPECIFIC DESCRIPTION OF THE INVENTION

The invention will be now described more in detail in the following examples, which are give, however, for illustrative but not limiting purposes.

Unless otherwise specified the parts and the percentages are to be understood as parts and percentages by weight.

EXAMPLE 1

Preparation of the silanic derivative of 2-chloro-4,6-bis(1-amino-anthraquinonyl)-s-triazine A dispersion of 22.3 parts of 1-aminoanthraquinone in 200 ml of nitrobenzene was brought to 100° C. and additioned with 9.22 parts of cyanuryl chloride and successively brought to 190° C. for 2 hours. The reaction mixture was filtered at a temperature of 150° C. and the cake was washed several times with methanol and then with n-heptane and was dried in an oven at a temperature of 110° C. About 23 parts of 2-chloro-4,6-bis-(1-aminoanthraquinonyl)-s-triazine were obtained.

| Elemental analysis | % C | H | Cl | N |
|---|---|---|---|---|
| Calculated | 66.73 | 2.87 | 6.37 | 12.55 |
| Found | 66.8 | 2.9 | 6.2 | 12.5 |

The suspension of 17.32 parts of 2-chloro-4,6-bis(1-aminoanthraquinonyl)-s-triazine in 130 ml of nitrobenzene was brought to 100° C. and additioned with 7.1 parts of γ-aminopropyltriethoxy-silane and with 2.07 parts of $K_2CO_3$, then it was gradually brought to the reflux temperature of the solvent.

After 2 hours it was cooled down to room temperature, filtered and washed several times with n-heptane. The filter dried cake, was pulped in 200 parts of water and stirred at the boiling temperature for about 2 hours. It was filtered at 70°-80° C., repeatedly washed with methanol and air-dried.

19.5 parts of a powder having a deep yellow-reddish colour were obtained, which subjected to elemental analysis, gave the following results:

% C=63; % H=4.35; % N=12.2; % Si=4.1

The determination of the ethanol percent by hydrolysis in Carius tube gave the following results: ethanol %=6.5. The obtained dye, subjected to infrared spectrophotometric analysis, showed, among other bands, absorption bands characteristics of the —Si—$(OC_2H_5)$ group at 960 cm$^{-1}$, 1170 cm$^{-1}$, 1080 cm$^{-1}$ and 1110 cm$^{-1}$.

The abovesaid analyses and IR analysis correspond to the dye of formula (A)

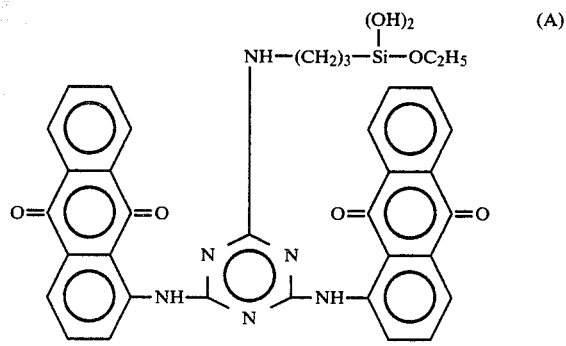

For the synthesis of the composite pigments, according to the present invention, the rough reaction product, partially hydrolized, was advantageously employed.

EXAMPLE 2

Preparation of the composite pigment in organic solvents

In this preparation a mixed inorganic substrate of $TiO_2$, $SiO_2$ and $Al_2O_3$ was utilized, that had been prepared as follows: 100 parts of $TiO_2$ were dispersed under mechanical stirring in 1000 ml of water; the dispersion was heated to 60° C.

After a stirring of 15 minutes, 210 ml of s sodium silicate solution (titre: 365.47 parts/l of $SiO_2$) and successively, in about 3 hours, about 200 ml of an Al sulphate solution (titre: 60 parts/l of $Al_2O_3$) were added.

The addition was stopped when the pH of the slurry had reached a value of 6. The slurry was kept under stirring at 60°0 C. for 1 hour, then the product was filtered, washed with water to remove the soluble salts and finally dried at a temperature of 70° C. The dry product was crushed and then ground in an automatic mortar. A white powder was obtained having the following composition:

% $TiO_2$=43.4; % $SiO_2$=35.1; % $Al_2O_3$=7.15; % crystallization water=14.35 and a specific surface=112 m$^2$/g.

The composite pigment was prepared by forming a suspension of 0.75 parts of silanic dye (A) of example 1, 1.75 parts of the inorganic substrate prepared as above said, in 100 ml of dimethylformamide and 0.5 parts of water, which suspension was brought to the reflux temperature of the solvent and kept at this temperature under stirring for 8 hours.

Successively, part of the solvent was continuously distilled and restored for 2 hours. The suspension was concentrated to ¼ of the initial volume of the solvent, and after addition of 25 ml of xylene, it was hot filtered at a temperature of 90° C. The cake was dried in an oven at 110° C. overnight, hot washed with 100 ml of a mixture at 50% of dimethylformamide and xylene, hot filtered, filter-washed with n-heptane and dried in an oven at 110° C. A yellow product was obtained, which by burning resulted to consist for 71% of inorganic ashes and had % C=13.85; % H=1.75; % N=2.64.

The coloured powder proved to be particularly fast towards the treatments, also in hot conditions, with organic or aqueous solvents; in applications such as stoving enamels or in plastic materials, such as polyvinylchloride, provided yellow-coloured products with a particularly pure tone, endowed with an excellent hiding power and a high tinting strength and, as well as with excellent general stabilities and in particular to overpainting and migration; with a good fastness towards the heat and the light both in bulk (mass) and in dilution with $TiO_2$.

It does not turn out that silanic dye (A) of example 1, possesses by itself those pigmentary characteristics which, conversely, are provided according to the present invention, by grafting on inorganic substrate, such as the fastnesses towards solvents, towards overcoating, towards migration in applications in stoving enamels or in plastic materials.

EXAMPLE 3

Preparation of the composite pigment in water 1 part of $TiO_2$, dispersed under mechanical stirring in 100 parts of water, was additioned with 0.8 parts of silanic dye (A) of example 1 and brought to 60° C. After 15 minutes ml 2.1 of sodium silicate (titre: 365,47 parts/l of $SiO_2$) and successively, in about 3 hours, about 2 ml of an Al sulphate solution (titre: 60 parts/l of $Al_2O_3$) were added.

The addition was stopped when the pH of the slurry had reached a value of 6. The slurry was kept under stirring at 60° C. for 1 hour, then the product was filtered, washed with water to remove the soluble salts and dried at a temperature of 110° C. overnight. A powder was obtained having a deep yellow colour, which by burning at 950° C., resulted to consist for the 70% of inorganic ashes and had % C=14.99, % H=1.64, % N=3.17.

The yellow coloured composite pigment exhibited pigmentary, optical characteristics, hiding power and tinting strength and general applicative fastnesses analogous with ones of the product obtained according to example 2, except for a slightly more reddish tonality.

EXAMPLE 4

By replacing the inorganic substrate of example 2 with $SiO_2$ having a high specific surface $\approx 200$ m$^2$/g and by operating according to weight ratios and modalities analogous with ones of example 2, a bright yellow powder was obtained, which, by burning at 900° C., resulted to consist for 72% of inorganic ashes.

The composite pigment proved to be particularly fast toward the aqueous or organic solvents, also in hot conditions; in applications both in stoving enamels and in polyvinylchloride (PVC), it provided transparent products having high general fastness towards migration, overpainting, light and heat, as well as a high tinting strength.

EXAMPLE 5

By operating as in example 3, by employing 0.8 parts of dye (A) of example (1), 4.5 ml of Na silicate and about 4 ml of Al sulphate, in the absence of $TiO_2$, a bright yellow pigment was obtained, consisting of 67% of inorganic ashes, with % C=14.57; % H=2.08, % N=3.3. It is perfectly transparent, fast towards both aqueous and organic solvents and in applications both in stoving enamels and in polyvinylchloride, it provides yellow products, which are perfectly transparent, possess a considerable gloss and excellent pigmentary and applicative characteristics.

EXAMPLE 6

By replacing the inorganic substrate of example 2 with $TiO_2$ of commercial type or with mixtures of $TiO_2$ of commercial type and $SiO_2$ having a specific surface of about 200 m$^2$/g and by operating under analogous conditions with the ones of Example 2, composite pigments with good general fastnesses and a very high hiding power—in the case of $TiO_2$ alone—with a decreasing hiding power—in the case of the mixtures—were obtained.

EXAMPLE 7

The preparation of the composite pigment of example 2 was repeated with the addition of 0.5 ml of vinyl-triethoxysilane and traces of benzoyl peroxides; by operating under conditions analogous with the ones described in example 2, a yellow powder was obtained which, on elemental analysis, resulted to consist of 69% of inorganic ashes. The composite pigment, besides possessing pigmentary characteristics and general fastnesses analogous with the ones of the product of example 2, exhibited an even better tinting strength in the abovesaid applications.

EXAMPLE 8

The preparation of the composite pigment of example 2 was repeated, with the addition of 0.5 parts of butyl-ortho-titanate [Ti(O-butyl)4]; by operating under conditions analogous with the one described in example 2, a yellow powder was obtained, which, on elemental analysis, resulted to consist of 70% of inorganic ashes. The composite pigment, besides possessing pigmentary characteristics and general fastnesses analogous with the ones of the product of example 2, exhibited an even better tinting strength, in the abovesaid applications.

EXAMPLES 9-25

By operating according to the technique of example 1, various silanic dyes were prepared and successively by operating according to the techniques of examples 2 and 3 the relevant composite pigments were prepared, by utilizing the aminoalkoxysilanes, the s-triazinyl-bis-anthraquinone dyes and the substrates indicated in Table 1. The obtained composite pigments having various chromaticity, exhibited pigmentary characteristics and general fastnesses, analogous with the ones of the products obtained according to examples 2 and 3.

TABLE 1

| | s-triazinyl-bis-anthraquinone dyes | Amino-alkoxysilane | Substrate | Tone |
|---|---|---|---|---|
| 9 | 2-chloro-4,6-bis-(1,4 diaminoanthraquinonyl)-s-triazine | γ-amino-propyl-triethoxy-silane | $TiO_2$, $SiO_2$, $Al_2O_3$ of example 2 | violet |
| 10 | 2-chloro-4,6-bis-(1,4-diaminoanthraquinonyl)-s-triazine | γ-amino-propyl-triethoxy-silane | $SiO_2$, $Al_2O_3$ of example 5 | violet |
| 11 | 2-chloro-4,6-bis-(2-amino-anthraquinonyl)-s-triazine | γ-amino-propyl triethoxy-silane | $SiO_2$, $Al_2O_3$ of example 5 | yellow |
| 12 | 2-chloro-4,6-bis-(1,5-diamino-anthraquinonyl)-s-triazine | γ-amino-propyl triethoxy-silane | $TiO_2$, $SiO_2$, $Al_2O_3$ of example 2 | red |
| 13 | 2-chloro-4,6-bis-(1-amino-4-acetylamino-anthraquinonyl)-s-triazine | γ-amino-propyl triethoxy-silane | $TiO_2$, $SiO_2$, $Al_2O_3$ of example 2 | red |
| 14 | 2-chloro-4,6-bis-(1-amino-4-acetylamino-anthraquinonyl)-s-triazine | γ-amino-propyl triethoxy-silane | $SiO_2$ of example 4 | red |
| 15 | 2-chloro-4,6-bis-(1-amino-4-acetylamino-anthraquinonyl)-s-triazine | γ-amino-propyl triethoxy-silane | $SiO_2$, $Al_2O_3$ of example 5 | red |
| 16 | 2-chloro-4,6-bis-(1-amino-5-acetylamino-anthraquinonyl)-s-triazine | γ-amino-propyl triethoxy-silane | $SiO_2$, $Al_2O_3$ of example 5 | yellow |
| 17 | 2-chloro-4,6-bis-(1-amino-5-acetylamino-anthraquinonyl)-s-triazine | γ-amino-propyl triethoxy-silane | $TiO_2$, $SiO_2$, $Al_2O_3$ of example 2 | yellow |
| 18 | 2-chloro-4,6-bis-(1-amino-4-phenylamino-anthraquinonyl)-s-triazine | γ-amino-propyl triethoxy-silane | $TiO_2$, $SiO_2$, $Al_2O_3$ of example 2 | blue |
| 19 | 2-chloro-4,6-bis-(1-amino-4-phenylamino-anthraquinonyl)-s-triazine | γ-amino-propyl triethoxy-silane | $SiO_2$, $Al_2O_3$ of example 5 | blue |
| 20 | 2-chloro-4,6-bis-(1-amino-4-phenylamino-anthraquinonyl)-s-triazine | δ-amino-butyl triethoxy-silane | $SiO_2$, $Al_2O_3$ of example 5 | blue |
| 21 | 2-chloro-4,6-bis-(1-amino-4-phenylamino-anthraquinonyl)-s-triazine | δ-amino-butyl phenyl-diethoxy-silane | $SiO_2$, $Al_2O_3$ of example 5 | blue |
| 22 | 2-chloro-4,6-bis-(1-amino-4-hydroxy-anthraquinonyl)-s-triazine | γ-amino-propyl triethoxy-silane | $SiO_2$, $Al_2O_3$ of example 5 | red |

TABLE 1-continued

| s-triazinyl-bis-anthraquinone dyes | Amino-alkoxysilane | Substrate | Tone |
|---|---|---|---|
| 23 2-chloro-4,6-bis-(1-amino-4-bromo-anthraquinonyl)-s-triazine | γ-amino-propyl triethoxy-silane | $SiO_2$, $Al_2O_3$ of example 5 | red |
| 24 2-chloro-4,6-bis-(1-amino-4-phenoxy-anthraquinonyl)-s-triazine | γ-amino-propyl triethoxy-silane | $SiO_2$, $Al_2O_3$ of example 5 | red |
| 25 2-chloro-4,6-bis-(1-amino-4-thiophenoxy-anthraquinonyl)-s-triazine | γ-amino-propyl triethoxy-silane | $SiO_2$, $Al_2O_3$ of example 5 | red |

EXAMPLE 26

(Application in PVC)

In a rotary arm mixer there were mixed, at 70° C.:
1.0 parts of the pigment obtained according to example 2,
100 parts of powdered polyvinyl chloride (PVC),
1.5 parts of calcium stearate exerting a complexing and stabilizing action,
3.0 parts of epoxidized soybean oil,
0.5 parts of lubricant (mixture of glycerides from $C_{16}$ to $C_{36}$),
2.0 parts of $TiO_2$.

The so obtained mixture was then treated at 180° C. in a three roll refiner until complete dispersion of the pigment in order to obtain a sheet exhibiting a particularly pure and highly hiding yellow tone, with a good colour strength, a good fastness towards the light, a good tinting strength, a good fastness towards the heat and an excellent fastness towards the migration.

EXAMPLE 27

(Application in enamel)

5.0 parts of pigments obtained according to example 2, were mixed by grinding with 95.0 parts of a fluid vehicle having the following composition:
22% of alkyd resin
19% of melamine resin
59% of xylene The homogenization was carried out in a ball mill by grinding the mixture in the presence of porcelain balls having a diameter of 10 mm for a period of 24 hours.

The so obtained enamel was applied onto the surface to be painted, it was allowed to dry overnight and then it was kept in an oven at 120°-125° C. for 20 minutes.

A painting was obtained exhibiting a pure yellow tone, an excellent hiding power, a good tinting strength, a fastness towards the light and towards the overpainting.

In order to obtain a paint having a lighter tone and a higher hiding power, 1 part of the enamel obtained as described herein before was further diluted with 9 parts of a white synthetic stoving enamel (10% of $TiO_2$) having the following composition:
30% of alkyd resin,
27% of melamine resin,
33% of xylene,
10% of $TiO_2$ The homogenization was carried out in a ball mill by grinding the mixture in the presence of porcelain balls having a diameter of 10 mm, for a period of 24 hours.

The so obtained cut enamel, was applied onto the surface to be painted, it was allowed to dry overnight and then it was kept in an oven at 120°-125° C. for 30 minutes.

A paint was obtained exhibiting a pure light yellow tone, good general fastnesses and a high hiding power.

What is claimed is:

1. Composite pigments, consisting of s-triazinyl-bis-anthraquinone dyes, containing silane groups grafted on a support selected from the group consisting of $TiO_2$ gel, semicrystalline, rutile, anatas $TiO_2$, associated with $Al_2O_3$, $SiO_2$, aluminum silicates, mica, talc and/or mixtures thereof having a value of the specific surface ranging between 5 and 500 $m^2/g$, said dyes having the formula:

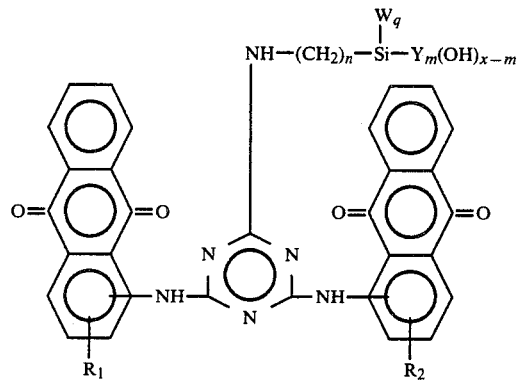

wherein $R_1$ and $R_2$, equal to each other or different from each other, are selected from the group consisting of a hydrogen atom, a primary amine group ($NH_2$), a secondary amine group of the —NH—R type, wherein R is an alkyl group containing from 1 to 4 carbon atoms or a phenyl group, an —NH—CO—$CH_3$ acetylamino group, an

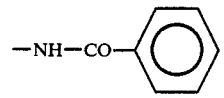

benzoylamino group, an —$NO_2$ nitro group, a halogen preferably bromine or chlorine, a hydroxyl radical, a phenol group and a thiophenol group;
n is a whole number comprised between 3 and 5
W indicates an alkyl group containing from 1 to 4 carbon atoms or a phenyl group;
Y indicates an alkoxy group containing from 1 to 4 carbon atoms
q is a whole number selected from 0-1
x and m are whole numbers such that, when q=0, x=3 and m=0, 1, 2, 3 and when q=1, x=2 and m=0, 1, 2.

2. Composite filaments according to claim 1 wherein the dyes are characterized in that the secondary amine group forming a bridge between the cyanurilic nucleus:

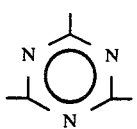

and the anthraquinonic system:

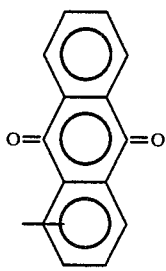

is linked in position alpha of the latter, $R_1$ and $R_2$ are equal to each other and bounded in position 4 or 5 of the anthraquinonic system and q is 0.

3. Composite pigments according to claim 1 or 2 wherein the surface ranges between 10 and 200 m²/g.

4. Composite pigments according to claim 1 or 2 containing from 10 to 50% by weight of the silanic dye of formula (I) in a grafted form.

5. A process for preparing the pigments defined in claim 1, characterized in that the support is treated with the dye, in a reaction medium consisting of an inert organic solvent, at a temperature ranging between 20° C. and the solvent reflux temperature in the presence of acid water due to HCl or alkaline water due to NaOH, in an at least equimolecular ratio with respect to the alkoxy groups of the dye and then, after an optional partial distillation of the solvent and of the water, the obtained pigment is filtered and the wet paste is treated at 100°–140° C. during a time period ranging between 2 and 16 hours.

6. A process according to claim 5 wherein the reaction temperature is between 60° and 150° C.

7. The process according to claim 5, characterized in that the silanic dye is at first separately hydrolyzed by means of, optionally slightly acid or alkaline, water.

8. A process for preparing the pigments defined in claim 1 or 2, characterized in that the support is treated with the silanic dye in a reaction medium consisting of, optionally acid or alkaline water, at a temperature ranging between 20° and 90° C. and then the obtained pigment is filtered and the wet phase is heated at 100°–140° C. for 2–16 hours.

9. The process according to claim 5 characterized in that a catalyst in an amount of 0.01 to 1% by weight of the dye is additionally employed.

10. The process according to claim 9 wherein the catalyst is selected from the group consisting of LiOH, $CF_3COOH$, Pb acetate and cobalt napthenate.

11. The process according to claim 5 characterized in that it is carried out in the presence of a compound selected from the group consisting of tetra-alkoxy-silanes, vinyl-trialkoxy-silanes, and alkylorthotitanates, having up to 4 carbon atoms, in a weight ratio, referred to the dye ranging between about 1:1 and 0.1:1.

12. The process according to claim 11, characterized in that it is carried out in the presence of a compound selected from the group consisting of $Si(OCH_3)_4$, $CH_2=CH-Si(OC_2H_5)_3$, $Ti(OC_4H_9)_4$ in a weight ratio, referred to the dye, ranging between about 1:1 and 0.1:1.

13. Use of the composite pigments according to claims 1 or 2 or 4 for dyeing plastic materials.

14. Use of the composite pigments according to claim 13 wherein the plastic is polyvinylchloride.

15. Use of the composite pigments according to claim 1 or 2 or 4 for preparing paints, stoving enamels and air enamels, inks and pastes for printing of fabrics.

* * * * *